United States Patent
Kwon et al.

(10) Patent No.: US 8,054,896 B2
(45) Date of Patent: Nov. 8, 2011

(54) METHOD AND APPARATUS FOR TRANSMITTING/RECEIVING CONTROL INFORMATION IN PACKET DATA COMMUNICATION SYSTEM

(75) Inventors: Hwan-Joon Kwon, Suwon-si (KR); Jin-Kyu Han, Seoul (KR); Dong-Hee Kim, Yongin-si (KR); Jae-Chon Yu, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 902 days.

(21) Appl. No.: 11/933,980

(22) Filed: Nov. 1, 2007

(65) Prior Publication Data
US 2008/0152029 A1   Jun. 26, 2008

(30) Foreign Application Priority Data
Nov. 1, 2006  (KR) .................. 10-2006-0107502

(51) Int. Cl.
*H04K 1/10* (2006.01)

(52) U.S. Cl. ........ 375/260; 375/279; 375/340; 370/317; 370/318; 455/3.01; 455/428

(58) Field of Classification Search .................. 375/260
See application file for complete search history.

(56) References Cited

U.S. PATENT DOCUMENTS

| | | |
|---|---|---|
| 6,977,944 B2 | 12/2005 | Brockmann et al. |
| 7,126,996 B2 | 10/2006 | Classon et al. |
| 7,197,276 B2 * | 3/2007 | Dale et al. ............. 455/3.01 |
| 2006/0052122 A1 * | 3/2006 | Matsui et al. ............ 455/509 |
| 2006/0133533 A1 * | 6/2006 | Khandekar et al. ......... 375/279 |

* cited by examiner

*Primary Examiner* — Shuwang Liu
*Assistant Examiner* — Lihong Yu
(74) *Attorney, Agent, or Firm* — The Farrell Law Firm, P.C.

(57) ABSTRACT

Provided is a control information transmission/reception method and apparatus for providing a packet data service in an OFDM based mobile communication system. The method includes transmitting a first maximum number of control channel blocks transmissible by using a first modulation scheme and a second maximum number of control channel blocks transmissible by using a second modulation scheme, the first modulation scheme having a lower modulation order from among modulation orders of multiple modulation schemes usable for control information within a frame, the second modulation scheme having a modulation order higher than the modulation order of the first modulation scheme within the frame; and transmitting first control channel blocks determined based on the first maximum number through the first modulation scheme within the frame and transmitting second control channel blocks determined based on the second maximum number through the second modulation scheme within the frame.

23 Claims, 10 Drawing Sheets

METHOD AND APPARATUS FOR TRANSMITTING/RECEIVING CONTROL INFORMATION IN PACKET DATA COMMUNICATION SYSTEM

PRIORITY

This application claims the priority under 35 U.S.C. §119(a) to a Korean Patent Application entitled "Method And Apparatus For Transmitting/Receiving Control Information In Packet Data Communication System" filed in the Korean Industrial Property Office on Nov. 1, 2006 and assigned Serial No. 2006-107502, the contents of which are hereby incorporated by reference.

BACKGROUND OF THE INVENTION

1. Field of the Invention

The present invention relates to a method and an apparatus for providing a packet data service in a mobile communication system, and more particularly to a method and an apparatus for transmitting/receiving control information for packet data in a mobile communication system using an Orthogonal Frequency Division Multiple Access (OFDMA) scheme.

2. Description of the Related Art

Active research is being conducted for recent mobile communication systems, in order to use an Orthogonal Frequency Division Multiplexing (OFDM) scheme in high speed data transmission through wire/wireless channels.

The OFDM scheme, which transmits data using multiple carriers, is a special type of a Multiple Carrier Modulation (MCM) scheme in which a serial symbol sequence is converted into parallel symbol sequences and the parallel symbol sequences are modulated with a plurality of mutually orthogonal sub-carriers before being transmitted. That is, in a transmission according to the OFDM scheme in an OFDM system, signals of users are identified by allocating different sub-carriers to physical channels allocated to the users. In general, system resources of an OFDMA system include two dimensional resources including frequency domain resource and time domain resources. That is, when a minimum unit for transmission of packet data through one physical channel on the time axis is called a Transmission Time Interval (TTI), which is also called a frame or a packet transmission interval, the TTI usually includes a plurality of OFDM symbols, each of which includes a plurality of sub-carriers on a frequency axis. Therefore, resources defined in one TTI have a form of two-dimensional resources including a plurality of OFDM symbols on the time axis and a plurality of sub-carriers on the frequency axis.

In the two-dimensional resources, one minimum resource unit, that is, one sub-carrier in one OFDM symbol, is usually called a Time-Frequency bin (TF bin), which servers as a unit for transmission of one modulated symbol in packet data transmission through an actual physical channel.

In a typical OFDM system, a physical channel for packet data transmission is called a packet data channel, and a physical channel for transmission of control information necessary for demodulation of the packet data channel is called a packet data control channel (hereinafter, "control channel"). Usually, packet data and control information are transmitted through the packet data channel and the packet data control channel.

In the OFDM system, a Forward Data CHannel (F-DCH) may be used for transmission of the packet data, and a Forward Shared Control CHannel (F-SCCH) may be used for transmission of the control information.

Packet data control information (hereinafter, "control information") necessary for demodulation of a packet data channel is transmitted through the packet data control channel.

That is, a receiver receiving packet data through a packet data channel first demodulates the packet data control channel, thereby acquiring control information necessary for demodulation of the packet data channel. Then, the receiver demodulates the packet data channel by using the control information. The transmitted packet data control channel usually includes a user identifier (hereinafter, "Medium Access Control IDentifier (MAC ID)"), resource allocation information, Modulation and Coding Scheme (MCS) information, etc. As used herein, the MAC ID refers to an identifier of an Access Terminal (AT) promised in advance between the AT and an Access Network (AN). In a typical OFDM packet data transmission/reception system, resources are shared by a plurality of users. Further, during every TTI, an Access Network (AN) scheduler selects a user who will use the system resources and transmits packet data through a predetermined resource to the selected user.

When the AN transmits packet data through a packet data channel to a particular AT, a MAC ID is promised in advance between the AN and the AT, and is then transmitted through the packet data channel during every TTI, so as to notify the AT which user the packet data the packet data is forwarded to through the packet data channel. Therefore, every AT within the system continuously monitors the packet data control channel, and continues determining whether a MAC ID received through the packet data control channel is identical with the ATs' own MAC IDs. When a MAC ID received through the packet data channel during a particular TTI is equal to an AT's own MAC ID, the AT determines that a data channel allocated together with the packet data control channel has been allocated to itself, and performs demodulation of the packet data channel.

Next, the control information received through the packet data control channel includes resource allocation information, which refers to information on resources used for transmission of packet data. Since one modulation symbol is carried by one TF bin at the time of packet data transmission through a physical channel as described above, it is impossible to demodulate the packet data channel without information on the resource actually used for the packet data transmission from among the two-dimensional resources within the single TTI, i.e., without information on the TF bin from a receiver. As used herein, MCS information refers to a modulation scheme and a coding rate used for the packet data transmission. The control information includes other type of information according to a particular purpose as well as the above-mentioned information.

Figure 1:
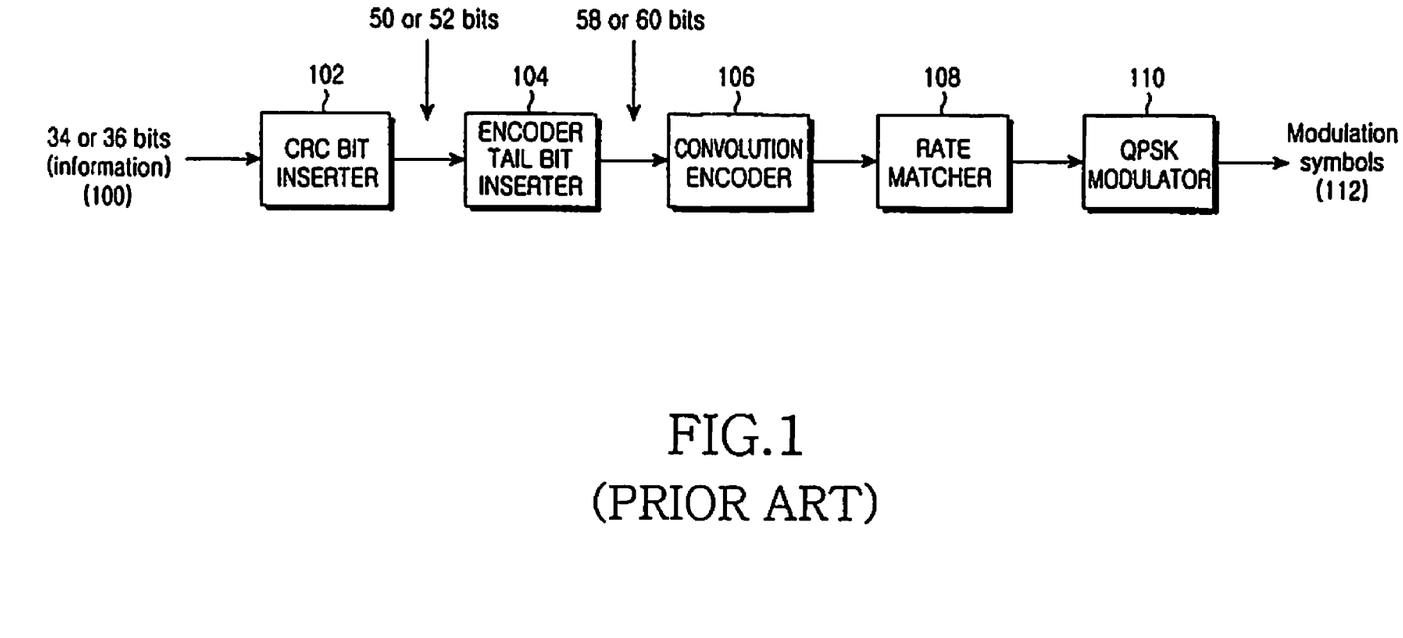
FIG. 1 is a block diagram illustrating a structure of a transmitter for constructing a packet data control channel in a typical OFDM-based mobile communication system.

FIG. 1 is a block diagram illustrating a structure of a transmitter for constructing a packet data control channel in a typical OFDM-based mobile communication system. Referring to FIG. 1, information bits 100 correspond to the control information as described above, which is assumed to have 34 or 36 bits. The number of bits, which is shown to be 34 or 36 in FIG. 1, is only a particular example and may change according to the communication system.

In the transmitter shown in FIG. 1, a Cyclic Redundancy Check (CRC) bit inserter 102 adds 16 CRC bits for detection of transmission errors in the control information 100 transmitted through the packet data control channel. Further, an encoder tail bit inserter 104 adds encoder tail bits having a size of 8 bits for convolution encoding to the 50 or 52 bits of control information output from the CRC bit inserter 102, and then outputs the encoder tail-added control information to a convolution encoder 106. Then, the convolution encoder 106 performs convolution encoding of the input bits, and a rate matcher 108 then performs rate matching of the encoded output from the convolution encoder 106.

In performing rate matching, the number of output modulation symbols of the control channel is controlled in accordance with the number of total sub-carriers allocated to the packet data control channel and the quantity of the resources allocated to the packet data control channel. The rate matching usually includes steps of repetition and puncturing.

The output of the rate matcher 108 is input to a Quadrature Phase Shift Keying (QPSK) modulator 110, and modulation symbols 112 are generated through a modulation process such as QPSK. Then, the modulated symbols 112 are transmitted through pre-allocated resources.

Meanwhile, packet data may be simultaneously transmitted through a plurality of data channels in a typical OFDMA system. That is, multiple control information elements may be simultaneously transmitted through the control channels as shown in FIG. 1. This implies that an AN may simultaneously transmit packet data to multiple ATs. Therefore, each AT demodulates control information elements through the multiple control channels simultaneously received from the AN, and determines, from the demodulated control information, the control channel through which the same MAC ID as its own MAC ID is received. In a conventional system, in order to support the operation as described above, a maximum number of control channels capable of transmitting the control information is pre-defined and is signaled to all ATs within the system.

For example, when the AN signals to all ATs within the system that "it is possible to transmit a maximum of four control channels," the ATs perform control channel demodulation based on a premise that each piece of control information can be transmitted through a maximum of four control channels, as long as there is no change in the signaled information. The resource for use in transmission of the control information is determined according to the determined maximum number of transmissible control channels.

Figure 2:
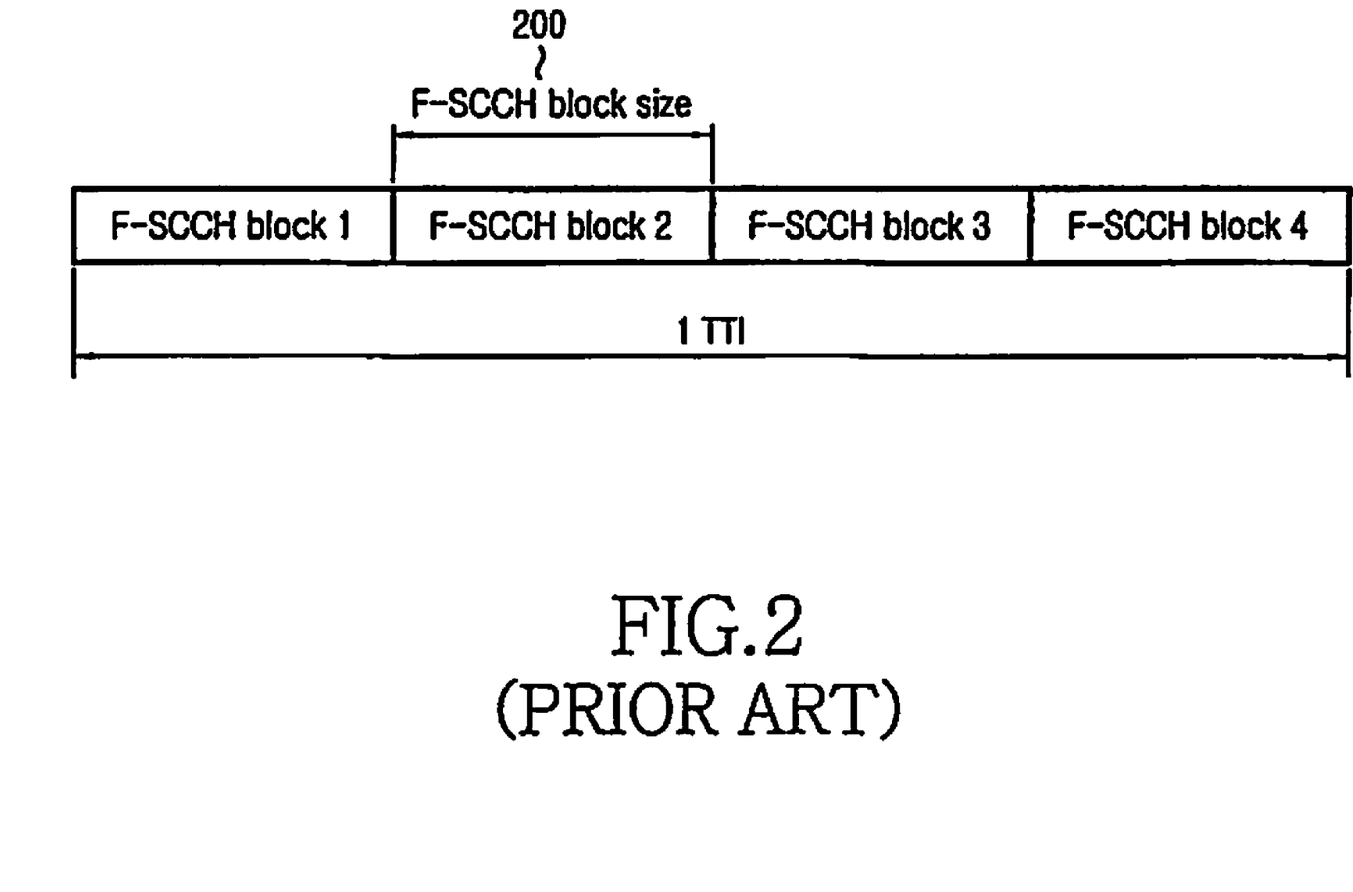
FIG. 2 illustrates an example of resource allocation when each piece of control information is transmitted simultaneously through four control channels in a typical OFDM mobile communication system.

FIG. 2 illustrates an example of resource allocation when each piece of control information is simultaneously transmitted through four control channels in a typical OFDM mobile communication system. Referring to FIG. 2, each rectangle indicates one Forward Shared Control CHannel (F-SCCH) block, which is transmitted through a predetermined allocated resource. In FIG. 2, the F-SCCH block size 200 corresponds to a block size for transmission of one control channel block and indicates the number of modulation symbols necessary for transmission of the control channel block.

Usually, the control channel block is transmitted through a plurality of sub-carriers over a plurality of OFDM symbols. FIG. 2 shows only the logical structure of the control channel blocks for convenience of description. However, the control channel blocks may be actually transmitted through physically separated sub-carriers, and the modulation symbols 112, which are the final output in FIG. 1, are transmitted through one control channel block from among the control channel blocks. In the system as described above, in which a predetermined quantity of resources are allocated for transmission of one control channel block and four control channels as an example can be transmitted during one TTI, four control channel blocks are used for transmission of the control information. In the above example, an AT receiving the control information performs demodulation of each of the four control channel blocks through a reverse process to that of the transmitter shown in FIG. 1, and then determines whether each demodulated control channel includes its own MAC ID. That is, in the above example, the AT performs an operation for receiving the control information transmitted through the four control channel blocks.

However, the fact that the maximum number of the transmitted control channels is four does not signify that the control information is always transmitted through four control channels during every TTI. Actually, the number of control channels transmitting control information during each TTI changes according to the scheduling result for the AT by the AN, that is, according to the resource allocation result. For example, if the AT determines to allocate all resources to one AT during a certain TTI, only one control channel is actually used for transmission of the control information during the TTI. However, since the AT does not know the number of control channels actually used for transmission of the control information, the AT attempts the demodulation the same number of times as the maximum number of control channels usable for transmission of the control information during one TTI.

Once the maximum number of control channels used for one-time transmission of the control information has been determined, resources for transmission of as much control information as the maximum number of control channels must be allocated. Further, the resources allocated for the control channel transmission cannot be used for another purpose, even when the number of control channels actually transmitting the control information is less than the maximum number of control channels. Therefore, it may be preferred to limit the maximum number of control channels to a small number. However, if the maximum number of control channels is limited to a small number, that small number may limit the data channel allocation by the AT. Therefore, it is not preferable to limit the maximum number of control channels to a small number. This is because the fact that the maximum number of control channels capable of transmitting control information during one TTI is four as in the above example implies that the maximum number of ATs simultaneously schedulable by the AN is only four.

Meanwhile, the conventional OFDMA system supports multiple layer transmission. The multiple layer transmission implies that a transmitter simultaneously transmits a plurality of packets either to multiple users or to a single user through the same time and frequency resources by using multiple transmission antennas. When the multiple layer transmission as described above is supported, the number of control channels necessary for the multiple layer transmission increases up to the number of the layers, because one control channel should be used whenever the packet data is transmitted through each layer. The increase in the number of control channels as described above results in increasing in the quantity of resources allocated to the control channels. Therefore, such an increase is a waste of resources in a TTI that does not use the resources, while a small maximum number of control channels imposes a limit on resource allocation.

SUMMARY OF THE INVENTION

Accordingly, the present invention has been made to solve the above-mentioned problems occurring in the prior art, and the present invention provides a control information transmission/reception method and apparatus for providing a packet data service in an OFDM based mobile communication system.

In accordance with an aspect of the present invention, there is provided a method for transmitting control information by an Access Network (AN) in a mobile communication system using an Orthogonal Frequency Division Multiple Access (OFDMA) scheme, the method including transmitting a first maximum number of control channel blocks transmissible by using a first modulation scheme and a second maximum number of control channel blocks transmissible by using a second modulation scheme, the first modulation scheme having a lower modulation order from among modulation orders of multiple modulation schemes usable for control information within a frame, the second modulation scheme having a modulation order higher than that of the first modulation scheme within the frame; and transmitting first control channel blocks determined based on the first maximum number through the first modulation scheme within the frame and transmitting second control channel blocks determined based on the second maximum number through the second modulation scheme within the frame.

In accordance with another aspect of the present invention, there is provided a method for receiving control information by an Access Terminal (AT) in a mobile communication system using an Orthogonal Frequency Division Multiple Access (OFDMA) scheme, the method including receiving a first maximum number of control channel blocks transmissible by using a first modulation scheme and a second maximum number of control channel blocks transmissible by using a second modulation scheme, the first modulation scheme having a lower modulation order from among modulation orders of multiple modulation schemes usable for control information within a frame, the second modulation scheme having a modulation order higher than the modulation order of the first modulation scheme within the frame; and when the AT supports the second modulation scheme, demodulating as many control channel blocks as a parameter value determined based on the second maximum number from among the first maximum number of control channel blocks by using the second modulation scheme, and demodulating the first maximum number of control channel blocks by using the first modulation scheme.

In accordance with another aspect of the present invention, there is provided an Access Network (AN) apparatus for transmitting control information in a mobile communication system using an Orthogonal Frequency Division Multiple Access (OFDMA) scheme, the AN apparatus including a controller for determining to broadcast a first maximum number of control channel blocks transmissible by using a first modulation scheme and a second maximum number of control channel blocks transmissible by using a second modulation scheme, wherein the first modulation scheme has a lower modulation order from among modulation orders of multiple modulation schemes usable for control information within a frame including a plurality of indexed control channel blocks containing the control information and the second modulation scheme has a modulation order higher than the modulation order of the first modulation scheme within the frame, negotiating with an Access Terminal (AT) that will receive the control information if the AT can support the second modulation scheme, transmitting control channel blocks having indexes higher than or equal to a parameter value determined based on the second maximum number, by using the first modulation scheme, and transmitting control channel blocks having indexes lower than the parameter value by using either the first modulation scheme or both the first modulation scheme and the second modulation scheme; and a transmission module for transmitting the control channel blocks, the first maximum number, and the second maximum number according to determination of the controller.

In accordance with another aspect of the present invention, there is provided an Access Terminal (AT) apparatus for receiving control information in a mobile communication system using an Orthogonal Frequency Division Multiple Access (OFDMA) scheme, the AT apparatus including a controller for determining to receive a first maximum number of control channel blocks transmissible by using a first modulation scheme and a second maximum number of control channel blocks transmissible by using a second modulation scheme, wherein the first modulation scheme has a lower modulation order from among modulation orders of multiple modulation schemes usable for control information within a frame including a plurality of indexed control channel blocks containing the control information and the second modulation scheme has a modulation order higher than the modulation order of the first modulation scheme within the frame, negotiating with an Access Network (AN) transmitting the control channel blocks if the AT can support the second modulation scheme, and when the AT supports the second modulation scheme, determining to demodulate as many control channel blocks as a parameter value determined based on the second maximum number from among the first maximum number of control channel blocks by using the second modulation scheme and to demodulate the first maximum number of control channel blocks by using the first modulation scheme; and a reception module for receiving the control information, the first maximum number, and the second maximum number under control of the controller.

BRIEF DESCRIPTION OF THE DRAWINGS

The above and other aspects, features and advantages of the present invention will be more apparent from the following detailed description taken in conjunction with the accompanying drawings, in which.

DETAILED DESCRIPTION OF THE EXEMPLARY EMBODIMENT

Hereinafter, exemplary embodiments of the present invention will be described with reference to the accompanying drawings. In the following description, a detailed description of known functions and configurations incorporated herein will be omitted when it may make the subject matter of the present invention rather unclear.

Figure 3:
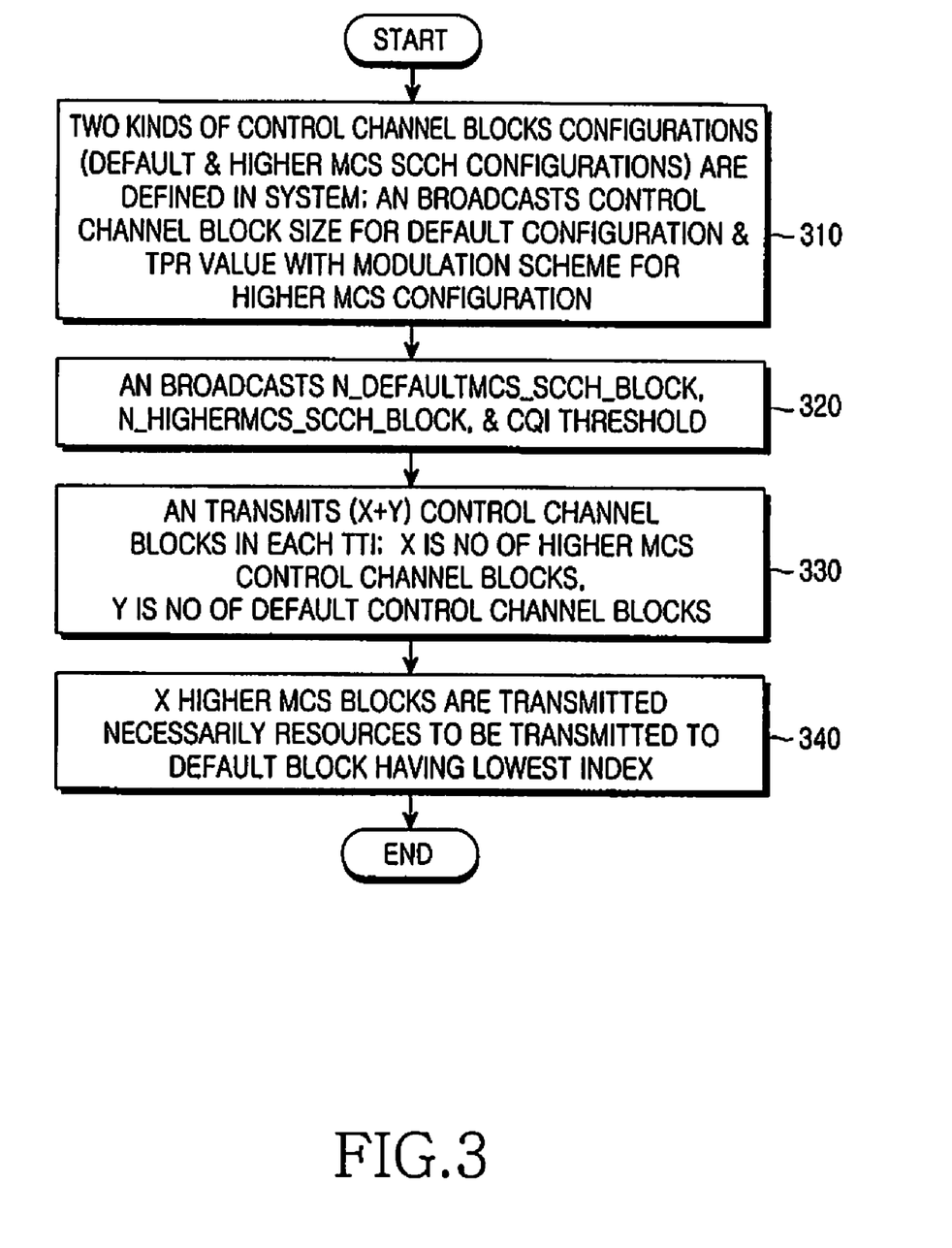
FIG. 3 is a flow diagram illustrating an operation of an Access Network (AN) for transmitting control information of packet data according to an exemplary embodiment of the present invention.

FIG. 3 is a flow diagram illustrating an operation of an Access Network (AN) for transmitting control information of packet data according to an exemplary embodiment of the present invention. Referring to FIG. 3, the AN configures two kinds of control channel blocks having different constructions in the system in step 310. In step 310, the control channels are constructed to have a Default Modulation and Coding Scheme (MCS) Shared Control Channel (SCCH) configuration (hereinafter, "default configuration") and a Higher MCS SCCH configuration (hereinafter, "higher MCS configuration"). As used herein, the default configuration refers to the use of a Quadrature Phase Shift Keying (QPSK) modulation scheme in transmitting control information through a control channel block. Further, the AN defines "The number of SCCH modulation symbols per block for default configuration" as the number of modulation symbols used in transmission of one control channel block by using the default configuration, and broadcasts the number of modulation symbols used in transmission of one control channel through a broadcast channel. The number of modulation symbols used in transmission of control information through one control channel corresponds to one block size 200 as shown in FIG. 2.

As used herein, "transmission of the control channel" refers to a transmission of control information through a control channel.

Figure 4:
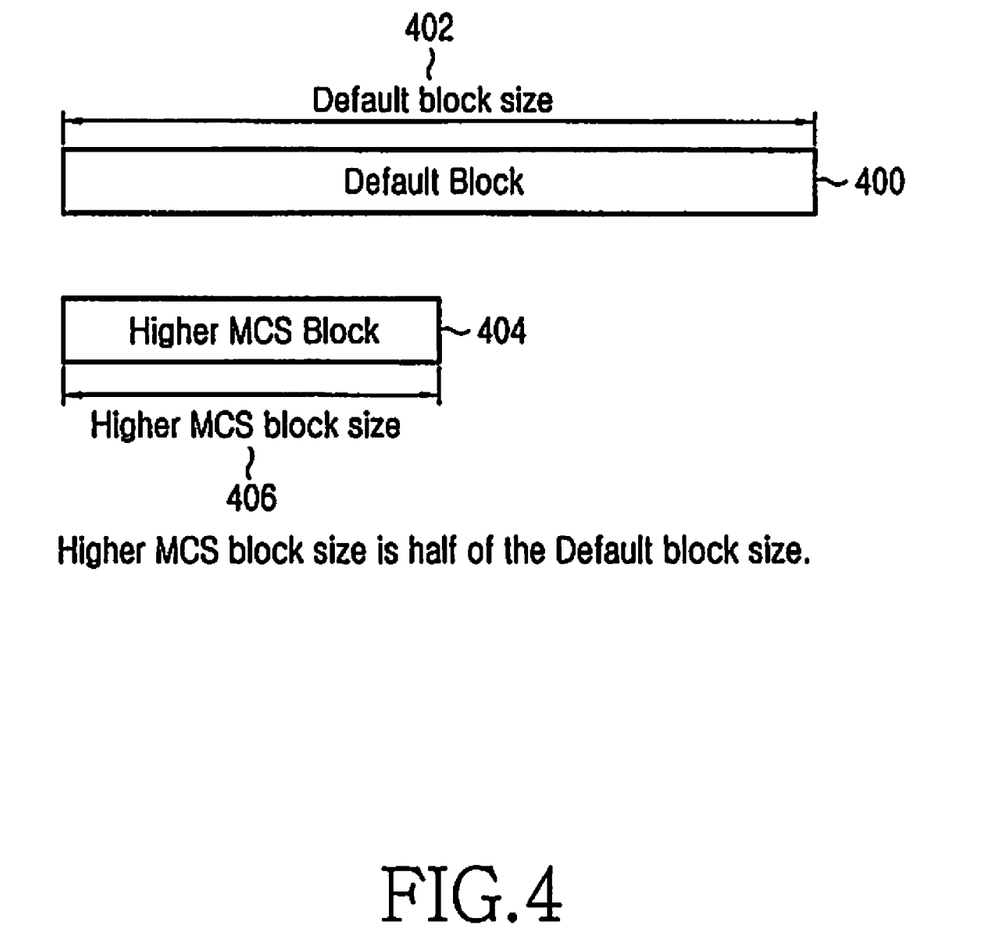
FIG. 4 illustrates the relation between the default block size and the higher MCS block size.

In the following description, control information transmitted using the default configuration, i.e., a control channel block, is called a default block 400, and the number of modulation symbols used in transmission of one control channel block using the default configuration is called a default block size 402. FIG. 4 illustrates the relation between the default block size 402 and the higher MCS block size 406.

The broadcast channel is a channel for transmitting system configuration information. Therefore, ATs acquire system configuration information through the broadcast channel and perform signal reception based on the acquired system configuration information.

In the present invention, the higher MCS configuration refers to the use of the QPSK modulation or 16 Quadrature Amplitude Modulation (QAM) modulation scheme in transmission of control information through a control channel block. The AN defines a modulation scheme selected from the QPSK modulation and the 16 QAM, and broadcasts the control information through the broadcast channel. When the 16 QAM is used as a modulation scheme in transmitting control information using the higher MCS configuration, the AN also transmits a Traffic-Pilot Ratio (TPR) value together with the control information. The TPR refers to a ratio between power used for transmission of a control channel in order for an AT to measure a reference value necessary for demodulation of a higher MCS block and power used in transmission of a pilot channel.

Further, the higher MCS configuration has a characteristic in that the number of modulation symbols used in transmission of control information using the higher MCS configuration, i.e., the higher MCS block size corresponds to one-half of the number of modulation symbols used in transmission of control information using the default configuration. This intends to minimize the complexity of an AT, which will be described later again, when the default configuration and the MCS configuration are used in a mixed manner in transmission of a control channel.

Therefore, in order to reduce the number of modulation symbols by one-half instead of employing the default configuration in transmitting control information, control information may be transmitted using either a modulation level higher than the modulation level used in the default configuration or a code rate two times higher than that of the default configuration. This manner of transmission is expressed as "transmission of control information using a higher MCS configuration" in the present specification.

That is, reduction of the number of allocated modulation symbols to one-half thereof in transmitting the same amount of information implies a doubling of the code rate in the case of using the same modulation scheme, such as a QPSK modulation scheme. Therefore, when control information is transmitted using one-half of the number of the modulation symbols used in the default configuration, the control information is transmitted using the higher MCS configuration. Further, in transmitting the same amount of information, when the number of allocated modulation symbols is one-half of the number of modulation symbols used in the default configuration and a modulation scheme (i.e. 16 QAM) higher than the QPSK used in transmission of control information using the default configuration is used, the control information is transmitted using the higher MCS configuration, because modulation scheme with a level one-step higher than the level of the default configuration is used, even though the same code rate as the code rate of the default configuration is used.

For example, when a transmitter has used a QPSK modulation scheme and a code rate of ¼ in transmitting control information using the default configuration, the transmitter may employ either the same modulation scheme (QPSK) as the modulation scheme of the default configuration with a different code rate (½) or the same code rate (¼) with a changed modulation scheme (16 QAM) in transmitting control information using the higher MCS configuration.

As used herein, a block of control information transmitted using the higher MCS configuration, i.e., a control channel block, is called a higher MCS block, and the number of modulation symbols used in transmission of one control channel block is called an MCS block size. The relation between the two kinds of control channel configurations defined in step 310 of FIG. 3, i.e., the relation between a default block and a higher MCS block, is described below with reference to FIG. 4.

FIG. 4 illustrates a relation between a default block 400 and a higher MCS block 404 according to the present invention. In FIG. 4, reference numeral 400 denotes a default block, which is a block of control information transmitted using a default configuration according to an embodiment of the present invention, and reference numeral 404 denotes a higher MCS block, which is a block of control information transmitted using a higher MCS configuration according to an embodiment of the present invention. It is noted from FIG. 4 that the default block size 402 is twice as large as the MCS block size 406 as described above.

In step 320 of FIG. 3, the AN broadcasts the number of default blocks (N_DefaultMCS_SCCH_Block), the number of higher MCS blocks (N_HigherMCS_SCCH_Block), a Channel Quality Indicator (CQI) threshold, etc. through a broadcast channel.

The number of default blocks (N_DefaultMCS_SCCH_Block) refers to a maximum number of control channel blocks transmissible using the default configuration during each TTI, and the number of higher MCS blocks (N_HigherMCS_SCCH_Block) refers to a maximum number of control channel blocks transmissible using the higher MCS configuration during each TTI. According to the present invention, the number of higher MCS blocks is an even number (0, 2, 4, . . . ). According to an embodiment of the present invention, it is assumed that each of the number of default blocks and the number of higher MCS blocks is four.

Hereinafter, step 320 will be discussed in more detail with reference to FIG. 5.

Figure 5:
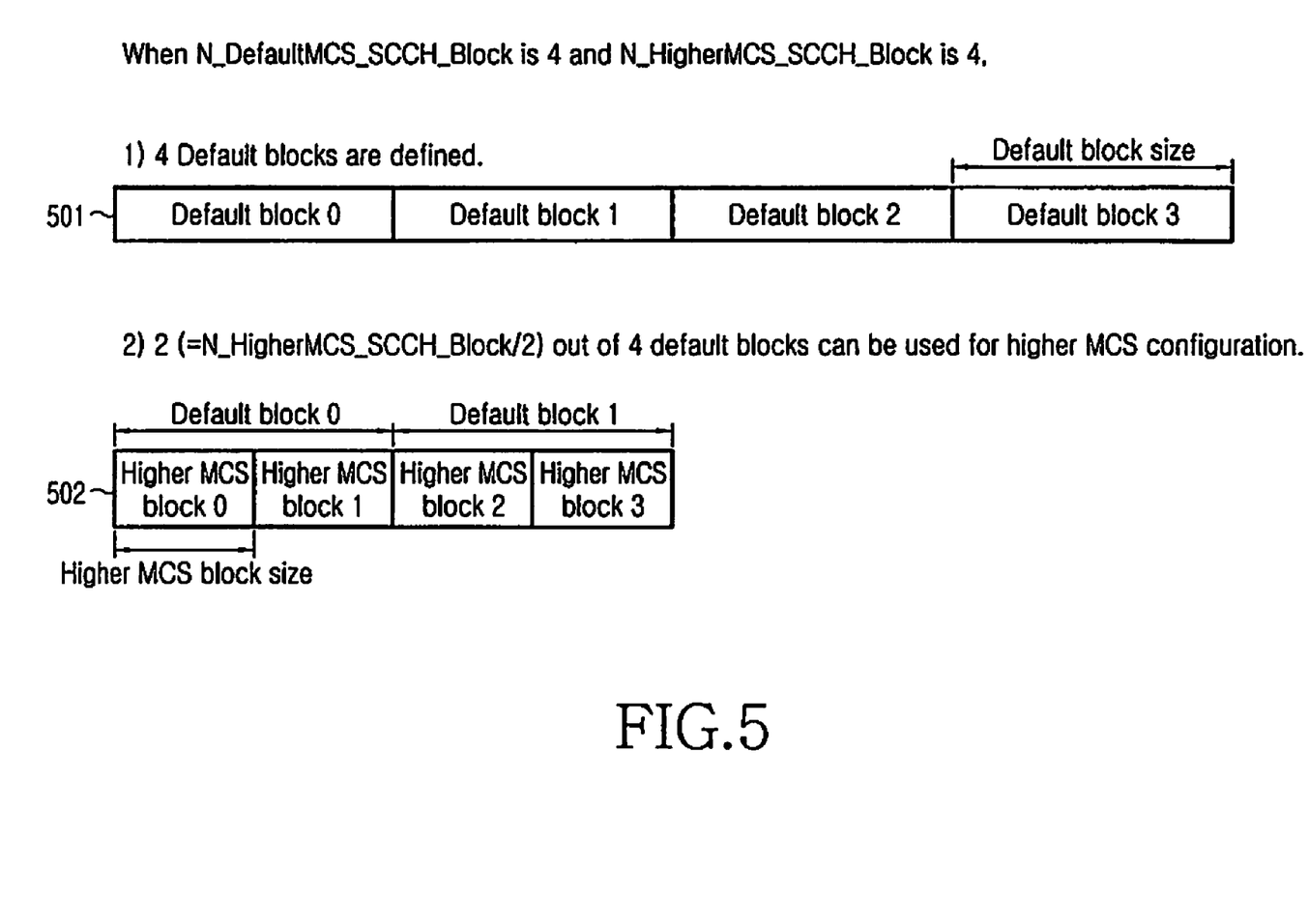
FIG. 5 illustrates transmission of a control channel when the number of default blocks (N_DefaultMCS_SCCH_Block) is four and the number of higher MCS blocks (N_HigherMCS_SCCH_Block) is four.

FIG. 5 illustrates transmission of a control channel when the number of default blocks (N_DefaultMCS_SCCH_Block) is four and the number of higher MCS blocks (N_HigherMCS_SCCH_Block) is four in step 320 of FIG. 3.

The presence of four default blocks implies that a maximum number of default blocks transmitted using the default configuration is four as designated by reference numeral 501. As shown, the default blocks may be indexed as default block 0, default block 1, default block 2, and default block 3. Further, the presence of four higher MCS blocks implies that resources for transmission of two default blocks (default block 0 and default block 1) having smaller indexes from among the four default blocks can be used for transmission of higher MCS blocks as designated by reference numeral 502.

Since the higher MCS block size is one-half of the default block size as described above, a maximum of four higher MCS blocks can be transmitted through the resources for transmission of two default blocks.

In step 320, the CQI threshold refers to a reference value used as a basis for determining whether the AT will receive the higher MCS blocks upon receiving control information through the control channel block configured as described above. An operation of the AT based on the CQI threshold will be described later in more detail. Therefore, when the AN transmits control information to an AT having reported a CQI lower than the CQI threshold, the AN should transmit the control information necessarily by using the default configuration. Further, the AN can use the higher MCS configuration when the AN transmits the control information to an AT that has reported a CQI higher than the CQI threshold.

Further, the AN negotiates with the AT about whether the AT can demodulate the control information modulated according to the 16 QAM modulation scheme, sets an Enable_HigherMCS_SCCH_Decoding value as a determined value according to a result of the negotiation, and then transmits a message including the set Enable_HigherMCS_SCCH_Decoding value to the AT. The Enable_HigherMCS_SCCH_Decoding value refers to a value indicating whether the AT supports the 16 QAM modulation scheme. When the Enable_HigherMCS_SCCH_Decoding value is set to be "1," the value implies that the AT supports the 16 QAM. In contrast, when the Enable_HigherMCS_SCCH_Decoding value is set to be "0," the value implies that the AT does not support the 16 QAM.

Further, in step 330 of FIG. 3, the AN transmits control information through an x number of control channel blocks of the higher MCS configuration and a y number of control channel blocks of the default MCS configuration during each TTI, wherein x and y have values defined by formula (I) below.

x: an integer from 0 to N_HigherMCS_SCCH_Block; and y: an integer from 0 to a value defined by $$N\_DefaultMCS\_SCCH\_Block - \left\lceil \frac{x}{2} \right\rceil \quad (1)$$

In the above definition, x corresponds to the number of control channel blocks transmitted using a modulation level having the higher modulation order, such as 16 QAM, from among the two kinds of modulation schemes used in the control channel transmission, and y corresponds to the number of control channel blocks transmitted using a modulation level having the lower modulation order, such as QPSK, from among the two kinds of modulation schemes used in the control channel transmission.

Further, according to the present invention, the AN uses only the QPSK in transmitting control channel blocks corresponding to indexes greater than or equal to ½ of the N_HigherMCS_SCCH_Block; which is the maximum number of control channel blocks to be transmitted using the 16 QAM, and uses either the QPSK or the 16 QAM in transmitting control channel blocks corresponding to indexes smaller than the index.

In the present invention, the value, that is, ½ of the N_HigherMCS_SCCH_Block, is defined as a parameter value for determining an index of a control channel block to be transmitted using either the QPSK or 16 QAM modulation scheme and an index of a control channel block to be transmitted using only the QPSK modulation scheme.

That is, according to the present invention, within one frame (Transmission Time Interval (TTI)) including indexed control channel blocks including control information, the AN can transmit control channel blocks having indexes greater than or equal to the determined parameter value by using the QPSK scheme, and can transmit control channel blocks having indexes smaller than the determined parameter value by using the 16 QAM or QPSK scheme.

In FIG. 5 described above, the parameter value is 4/2, i.e., 2. Further, the default blocks of FIG. 5 having indexes lager than or equal to the parameter value "2," such as default block 2 and default block 3, are transmitted using the QPSK modulation scheme, and control channel blocks transmitted through resources for transmission of default blocks having indexes less than the parameter value are transmitted using the 16 QAM modulation scheme.

Figure 6:
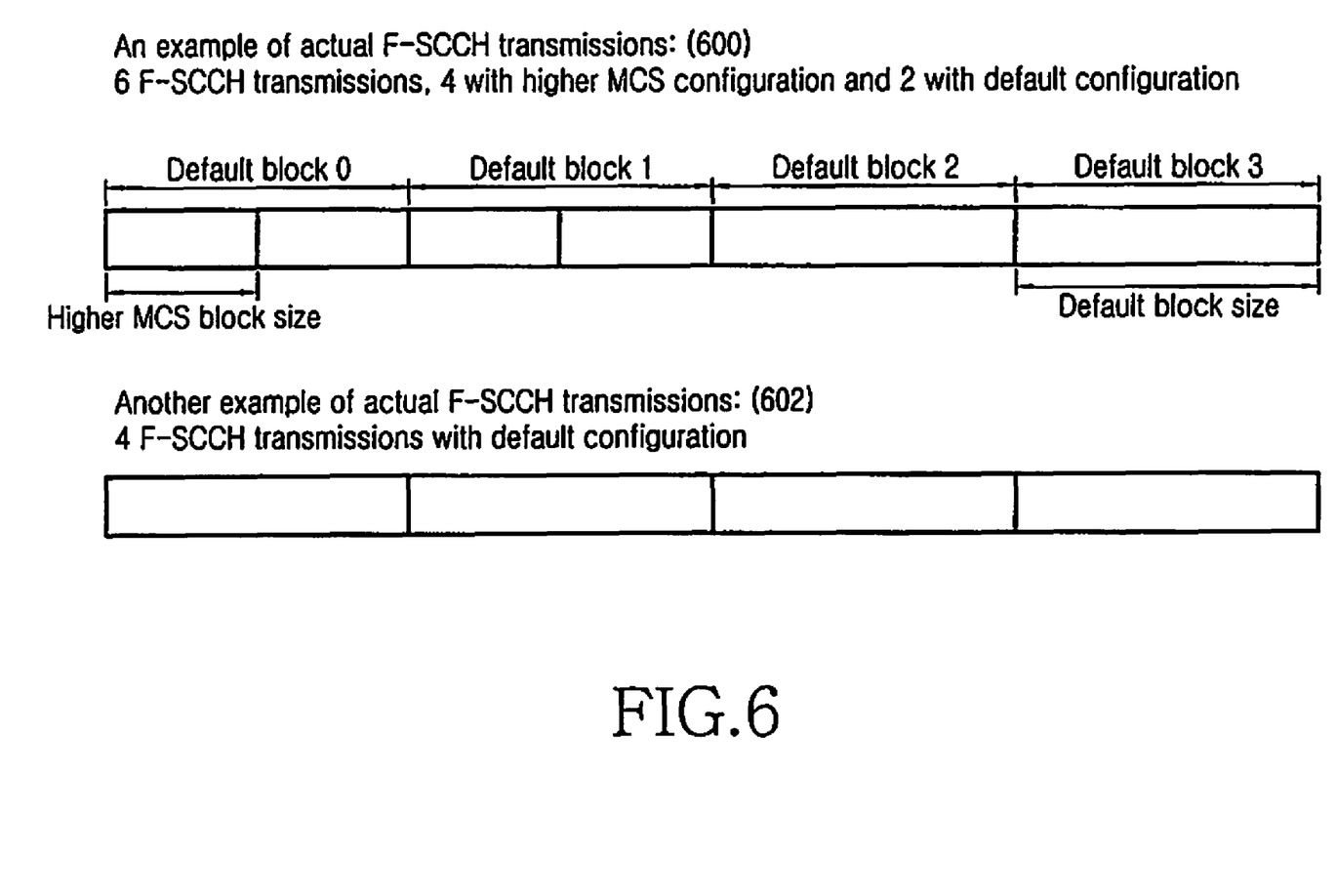
FIG. 6 illustrates a process of transmitting control channel blocks by an AT in a particular TTI when the number of default blocks is four and the number of higher MCS blocks is four.

FIG. 6 illustrates a process of transmitting an (x+y) number of control channel blocks as in step 330 of FIG. 3 according to an embodiment of the present invention.

In the embodiment shown in FIG. 6, the AN transmits control information through a control channel block at a particular TTI when the number of default blocks (N_DefaultMCS_SCCH_Block) is four and the number of higher MCS blocks (N_HigherMCS_SCCH_Block) is four.

In FIG. 6, reference numeral 600 designates an example of actual transmission of four control channel blocks using the higher MCS configuration and two control channel blocks using the default configuration by the AN. That is, the N_HigherMCS_SCCH_Block refers to the maximum number of control channel blocks transmissible by using the higher MCS configuration, which is four. Therefore, it is noted that the maximum number of control channel blocks is used in the control channel block transmission 600. That is, the parameter value is 2 in the transmission 200 of FIG. 6.

Then, in step 340, the AN transmits the control channel blocks, which use four higher MCS configurations in step 330, through the resources for transmitting the two control channel blocks (default block 0 and default block 1) having the lower indexes, from among the four default blocks as described above with reference to FIG. 5.

In FIG. 6, reference numeral 602 designates an example of actual transmission of zero control channel blocks using the higher MCS configuration and control channel blocks using four default configurations by the AN. That is, even though the number of default blocks (N_DefaultMCS_SCCH_Block) is four, which corresponds to just the maximum number of default blocks transmissible by using the default configuration, the AN may actually transmit zero control channel blocks using the higher MCS configuration as in the above example.

In other words, even though N_HigherMCS_SCCH_Block is "4," which implies that the maximum number of higher MCS blocks transmissible within one frame is four, it is possible to transmit only four control channel blocks using the default configuration without transmitting the control channel blocks using the higher MCS configuration as in the example 602. Therefore, if formula (I) is applied to the example 602, 0 is obtained as the value of x, which implies that the maximum number of transmissible control channel blocks using the default configuration is four. Therefore, in the example 602, the maximum number of control channel blocks using the default configuration, that is, four default blocks, are transmitted. In the example 602, the parameter value is "0." Therefore, since there is no default block having an index lower than "0," all control channel blocks are transmitting using only the QPSK.

Figure 7:
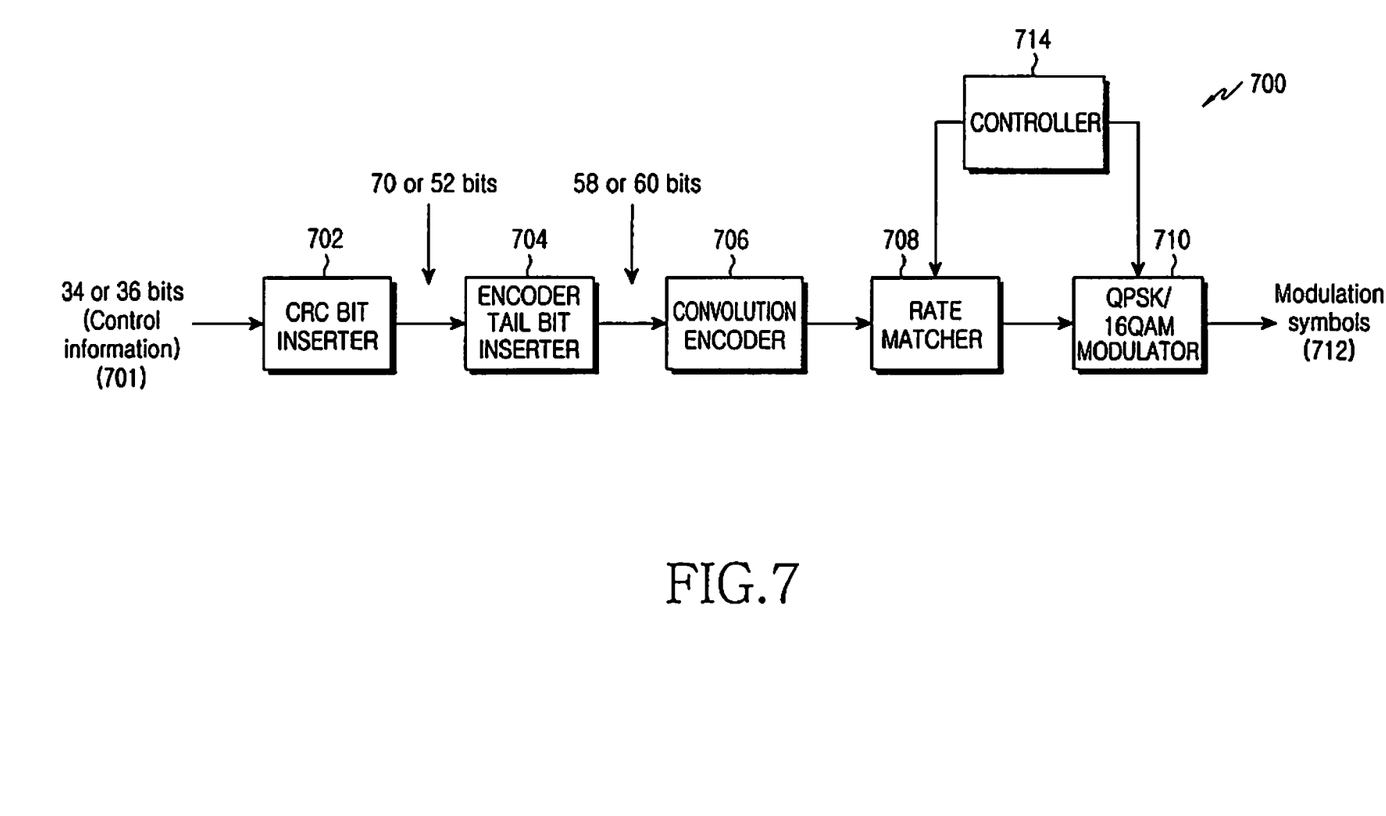
FIG. 7 is a block diagram illustrating a structure of a transmitter for transmitting control information by using the default configuration and the higher MCS configuration according to the present invention.

FIG. 7 is a block diagram illustrating a structure of a transmitter 700 for transmitting control information by using the default configuration and the higher MCS configuration according to the present invention.

The transmitter 700 transmitting control information by using the higher MCS configuration according to the present embodiment is slightly different from the transmitter of FIG. 1 transmitting control information by using only the default configuration in view of the operations of the rate matcher 708, the modulator 710, and the controller 714.

First, the CRC bit inserter 702 inserts CRC bits to detect a transmission error of the control information by the receiver to 34 or 36 bits of input control information 701, and then outputs the CRC-inserted control information. Then, the encoder tail bit inserter 704 adds tail bits to the CRC-inserted control information from the CRC bit inserter 702 and outputs the tail bit-added control information to the convolution encoder 706. The convolution encoder 706 convolution-encodes the output of the encoder tail bit inserter 704 and outputs the encoded symbols to the rate matcher 708.

If it is necessary to transmit a control channel block using the higher MCS configuration in a particular TTI according to an embodiment of the present invention, the controller 714 generates modulation symbols 712 to be transmitted using the higher MCS configuration by controlling the rate matcher 708 or the QPSK/16 QAM modulator 710, so as to transmit the control information by using a modulation scheme, a coding rate, or a puncturing rate different from those used in transmission of the control channel blocks using the default configuration.

For example, when there is a control channel block to be transmitted using the higher MCS configuration based on an assumption that the default configuration uses QPSK as a modulation scheme and ¼ as a code rate, it is possible to transmit the control information by using the following methods:

1. In the case of using the same modulation scheme as the modulation scheme of the default configuration in the higher MCS configuration, the controller 714 controls the QPSK/16 QAM modulator 710 and the rate matcher 708 so that the QPSK/16 QAM modulator 710 uses QPSK as a scheme for modulation of the control information, and the rate matcher 708 performs the rate matching with a double puncturing rate for the encoded symbols output from the convolution encoder 706 in comparison with the default configuration.

2. In the case of using a modulation scheme of a higher level in the MCS configuration rather than the level of the default configuration, the controller 714 controls the QPSK/16 QAM modulator 710 and the rate matcher 708 so that the rate matcher 708 maintains the same code rate as the code rate of the default configuration and the QPSK/16 QAM modulator 710 16 QAM-modulates the signal rate-matched by the rate matcher 708, and then outputs the 16 QAM-modulated signal.

Hereinafter, a unit including the elements designated by reference numerals 702 through 710 in FIG. 7 will be referred to as a transmission module.

Within a single frame (one TTI) including a plurality of indexed control channel blocks containing control information, the controller 714 of the transmitter 700, according to an embodiment of the present invention, determines to broadcast N_DefaultMCS_SCCH_Block and N_HigherMCS_SCCH_Block. The N_DefaultMCS_SCCH_Block corresponds to the first maximum number of control channel blocks transmissible using the first modulation scheme (QPSK) having the lower modulation order from among two modulation schemes available for the control information, and the N_HigherMCS_SCCH_Block corresponds to the second maximum number of control channel blocks transmissible using the second modulation scheme (16 QAM) having a modulation order higher than that of the first modulation scheme within the single frame. Further, the controller 714 negotiates with an AT that will receive the control information if the AT can support the second modulation scheme. As a result of negotiation, when the AT can support the second modulation scheme, the controller 714 determines to use the first modulation scheme in transmitting control channel blocks having indexes higher than or equal to a parameter value determined in consideration of the second maximum number within the single frame, and determines to use either the first modulation scheme or the second modulation scheme in transmitting control channel blocks having indexes lower than the parameter value.

Further, based on the determination of the controller 714, the transmission module modulates and transmits the control channel blocks and transmits information necessary for demodulation of the control channel blocks.

Figure 8:
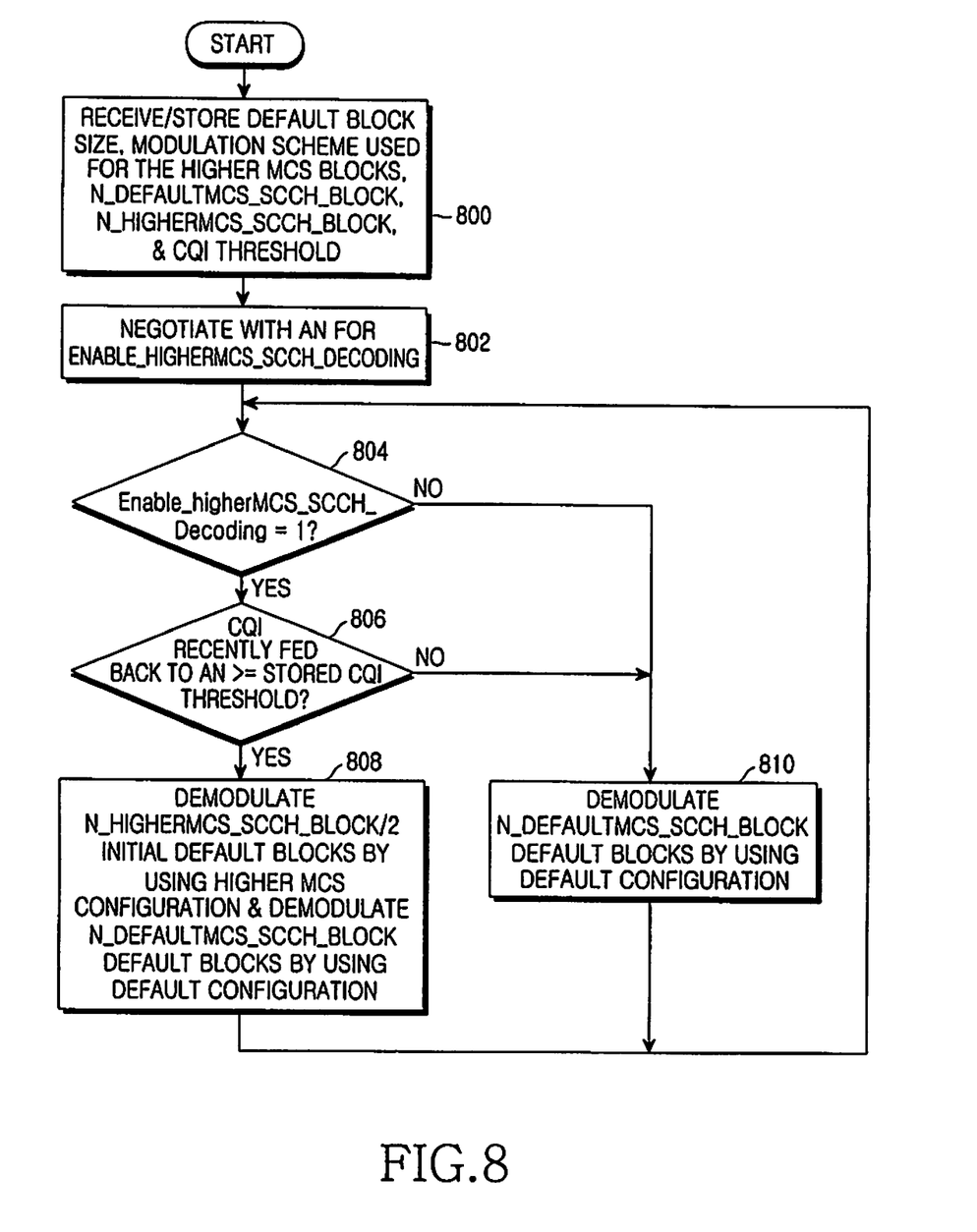
FIG. 8 is a flow diagram illustrating an operation of an AT for receiving control channel blocks according to an embodiment of the present invention.

FIG. 8 is a flow diagram illustrating an operation of an AT for receiving control channel blocks according to an embodiment of the present invention.

Referring to FIG. 8, in step 800, the AT first receives parameter values described in steps 310 and 320 of FIG. 3 through a broadcast channel. Specifically, the AT receives and stores a default block size, a modulation scheme used for the higher MCS blocks, the maximum number of default blocks, the maximum number of higher MCS blocks, a CQI threshold, etc. Then, in step 802, the AT negotiates with the AN to determine whether the AT should receive the control channel blocks transmitted using the higher MCS configuration. As used herein, a signaling value for the negotiation is named "Enable_HigherMCS_SCCH_Decoding" for convenience of description.

When a signaling value "Enable_HigherMCS_SCCH_Decoding" is obtained as a result of the negotiation, the AT demodulates the control channel block by using either a demodulation scheme corresponding to the 16 QAM or a demodulation scheme corresponding to the QPSK based on the resultant value.

Step 802 corresponds to a step in which the AN determines whether the AN will cause each AT to additionally receive control channel blocks using the higher MCS configuration, so as to make the reception operation of the AT more complicated.

For example, if the AT can receive control channel blocks transmitted according to a modulation scheme (16 QAM) using a higher modulation order than that of the modulation scheme (QPSK) used in the default block transmission, the AN may set the value "Enable_HigherMCS_SCCH_Decoding" to "1." Otherwise, the AN may set the value "Enable_HigherMCS_SCCH_Decoding" to "0."

As used herein, the value "Enable_HigherMCS_SCCH_Decoding" corresponds to a value indicating whether the AT can support a demodulation scheme corresponding to the 16 QAM modulation scheme.

As a result of the determination in step 804, when the value "Enable_HigherMCS_SCCH_Decoding" is "0," the AT proceeds to step 810 in which the AT demodulates, by using the default configuration, as many control channel blocks as the number of default blocks received through the broadcast channel.

That is, as a result of the determination in step 804, when the value "Enable_HigherMCS_SCCH_Decoding" is "0," the AT demodulates the control channel blocks transmitted within one frame according to a demodulation scheme corresponding to the QPSK modulation scheme.

Figure 9:
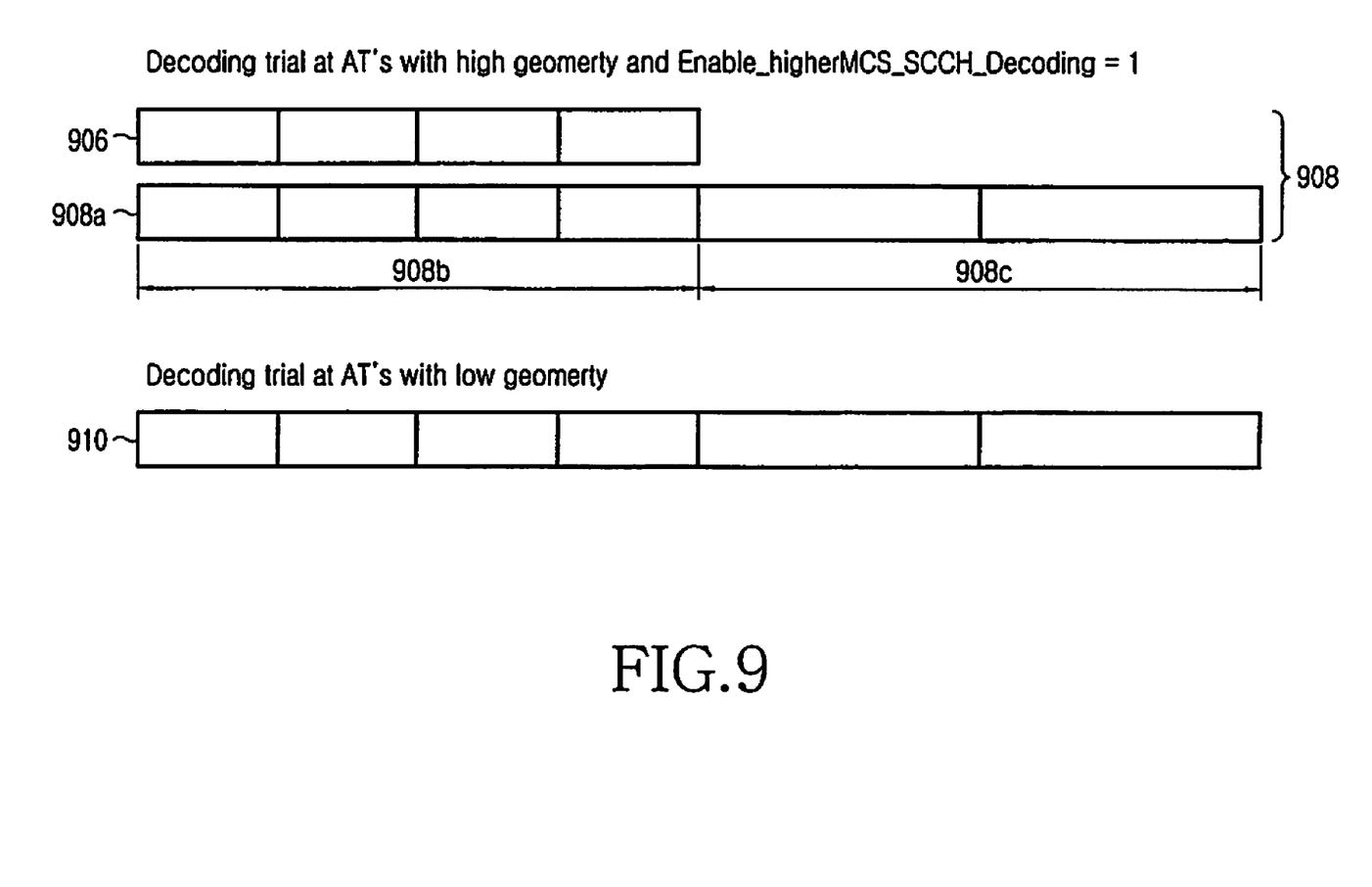
FIG. 9 illustrates structures of control channel blocks received by an AT according to the process shown in FIG. 8.

The demodulation in step 810 is based on an assumption that the AN has transmitted the control channel blocks in the same manner as the example 602 of FIG. 6 as shown in FIG. 9. That is, the AT demodulates as many control channel blocks having the default configuration as the number of default blocks (N_DefaultMCS_SCCH_Block) acquired in step 800. This step will be described later again with reference to FIG. 9. Meanwhile, as a result of the determination in step 804, when the "Enable_HigherMCS_SCCH_Decoding" value is "1," the AT proceeds to step 806, in which the AT determines whether a Channel Quality Indicator (CQI) value recently reported to the AN is greater than the CQI threshold stored in step 800. As a result of the determination in step 806, when the CQI value is not greater than the CQI threshold, the AT performs step 810.

In contrast, as a result of the determination in step 806, when the CQI value is greater than the CQI threshold, the AT performs step 808. In step 808, the AT attempts demodulation of the control channel blocks for all combinations of the number of higher MCS blocks (N_HigherMCS_SCCH_Block) and the number of default blocks (N_DefaultMCS_SCCH_Block) acquired in step 800, which can be used in transmission of control channel blocks by the AN. In other words, the AT attempts demodulation of the control channel blocks for all cases of possible combination between the number of higher MCS blocks and the number of default blocks acquired through the broadcast channel from the AN.

If both the higher MCS blocks and the default blocks are transmitted, the demodulation is attempted based on an assumption that an N_HigherMCS_SCCH_Block/2 number of default blocks corresponding to the lower index from among the N_DefaultMCS_SCCH_Block number of default blocks correspond to an N_HigherMCS_SCCH_Block/2 number of control channel blocks using the higher MCS configuration. In other words, in the present invention, when the "Enable_HigherMCS_SCCH_Decoding" value is set to "1," the AT demodulates the control channel blocks (default blocks) having indexes higher than or equal to the N_HigherMCS_SCCH_Block/2 by using a demodulation scheme corresponding to the QPSK scheme, and demodulates the control channel blocks having indexes lower than the N_HigherMCS_SCCH_Block/2 by using a demodulation scheme corresponding to the 16 QAM or QPSK scheme, within a single frame (TTI) including indexed control channel blocks containing control information. In contrast, if only the default blocks are transmitted, the N_HigherMCS_SCCH_Block/2 has a value of "0," so the AT attempts demodulation of control channel blocks using the default configuration for the N_DefaultMCS_SCCH_Block blocks. From among all the attempts as described above, which attempt is correct is determined through a CRC checking for a CRC bit included in the transmitted control channel.

FIG. 9 illustrates structures of control channel blocks received by an AT according to the process shown in FIG. 8.

First, the attempted demodulation in step 808 of FIG. 8 is based on an assumption that the control channel blocks have a configuration as designated by reference numeral 908. That is, in the demodulation attempt with the default configuration, it is assumed that two blocks 908b having the lower indexes from among the default blocks 908a are an N_HigherMCS_SCCH_Block number of control channel blocks (four control channel blocks) using the higher MCS configuration as indicated by reference numeral 906, and that the default blocks 908c having indexes after the two blocks 908b have not been transmitted through the higher MCS configuration.

Otherwise, when the control channel blocks are configured as designated by reference numeral 908, the AT may first attempt to demodulate the four default blocks 908a according to the QPSK scheme, and may then demodulate higher MCS blocks according to the 16 QAM scheme since it may receive four higher MCS blocks having the higher MCS configuration instead of the two default blocks 908b having the lower indexes. That is, the AT can attempt demodulation for all possible cases by referring to the number of default MCS blocks and the number of higher MCS blocks.

Further, the attempted of demodulation in step 810 of FIG. 8 is based on an assumption that the control channel blocks have been transmitted using only the default configuration without using the higher MCS configuration as indicated by reference numeral 910 of FIG. 9. That is, the attempted of demodulation in step 810 of FIG. 8 is based on an assumption that all control channel blocks are default blocks.

Figure 10:
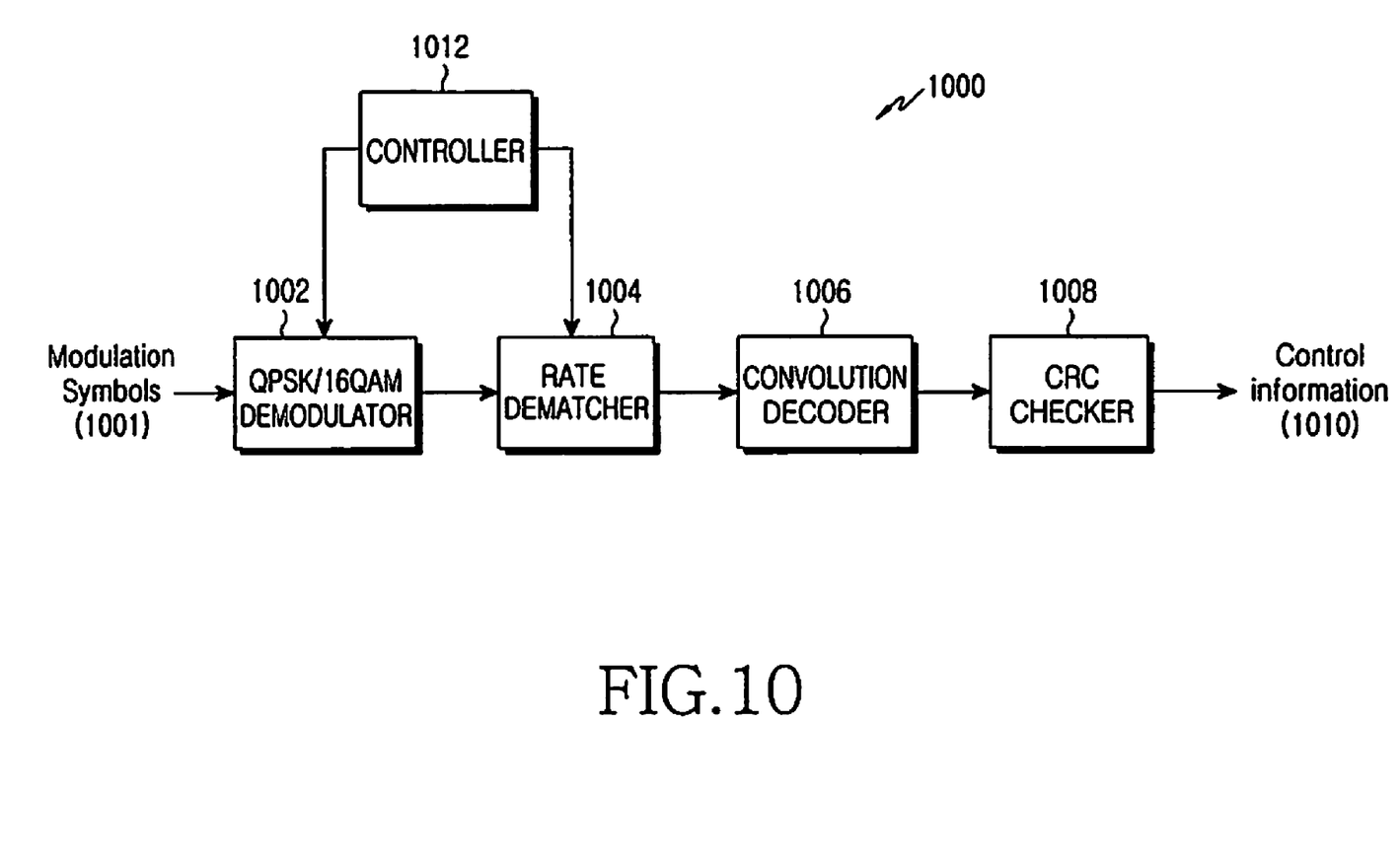
FIG. 10 is a block diagram of an AT according to an embodiment of the present invention.

FIG. 10 is a block diagram of an AT according to an embodiment of the present invention.

The receiver 1000 shown in FIG. 10 demodulates a control channel by performing a process inverse to that the process of the transmitter 700 shown in FIG. 7.

The QPSK/16 QAM demodulator 1002 demodulates modulation symbols 1001 from a transmitter by using the QPSK or 16 QAM scheme under the control of the controller 1012, and the rate dematcher 1004 performs an operation inverse to that of the transmitter 700 under the control of the controller 1012.

The controller 1012 determines to receive the maximum number (N_DefaultMCS_SCCH_Block) of control channel blocks transmissible using the QPSK scheme having the lower modulation order from among two modulation schemes available for the control information within a single frame (one TTI) including a plurality of indexed control channel blocks containing control information and the maximum number (N_HigherMCS_SCCH_Block) of control channel blocks transmissible using the 16 QAM scheme having a modulation order higher than that of the QPSK scheme. Then, the controller 1012 negotiates with the AN to determine whether it is possible to support the demodulation scheme corresponding to the 16 QAM modulation.

After negotiating with the AN, if it is possible to support the demodulation scheme corresponding to the 16 QAM modulation, the controller 1012 controls the QPSK/16 QAM demodulator 1010 so that the QPSK/16 QAM modulator 1010 uses the QPSK scheme in demodulation of the control channel blocks having the default configuration when the modulation level of the control channel blocks transmitted using the higher MCS configuration is higher than the modulation level of the control channel blocks transmitted using the default configuration, while using the 16 QAM scheme having a modulation level higher than that of the QPSK scheme in demodulation of the control channel blocks having the higher MCS configuration.

In other words, under the control of the controller 1012, the QPSK/16 QAM demodulator 1002 demodulates the received modulation symbols according to the QPSK scheme when the negotiated "Enable_HigherMCS_SCCH_Decoding" value is "0," and demodulates the received modulation symbols according to either the QPSK scheme or the 16 QAM scheme when the negotiated "Enable_HigherMCS_SCCH_Decoding" value is "1."

Meanwhile, when the modulation level of the control channel blocks transmitted using the default configuration is equal to the modulation level of the control channel blocks transmitted using the higher MCS configuration, the controller 1012 may control the rate dematcher 1004 such that the code rate to be used in demodulation of the control channel blocks of the higher MCS configuration is twice as large as the code rate to be used in demodulation of the control channel blocks of the default configuration.

The signal rate-dematched in the rate dematcher 1004 under the control of the controller 1012 is convolution-decoded by the convolution decoder 1006 and is then output to the CRC checker 1008. Then, the CRC checker 1008 performs CRC checking for the input signal in order to detect a possible error, and then outputs control information 1010.

Hereinafter, a unit including the elements designated by reference numerals 1002 through 1008 in FIG. 10 will be referred to as a reception module.

In the receiver 1000 according to the present invention, the controller 1012 identifies a predetermined value (Enable_HigherMCS_SCCH_Decoding) indicating whether the AT can support a modulation scheme having the higher modulation order from among the two modulation schemes usable for the control information within a single frame (one TTI) including control information. The predetermined value may be received from the AN. Further, when the predetermined value is set to be a value capable of supporting a demodulation scheme corresponding to the 16 QAM scheme, the AT attempts demodulation of N_HigherMCS_SCCH_Block/2 blocks by using the higher MCS configuration, and attempts demodulation of N_DefaultMCS_SCCH_Block blocks by using the default MCS configuration.

In an OFDM mobile communication system according to the present invention, it is possible to reduce resources for transmission of control information necessary for demodulation of packet data, and it is thus possible to expect an enhanced data throughput.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method for transmitting control information by an Access Network (AN) in a mobile communication system using an Orthogonal Frequency Division Multiple Access (OFDMA) scheme, the method comprising the steps of:
  (1) transmitting information indicating a first maximum number of control channel blocks that are transmissible using a first modulation scheme and information indicating a second maximum number of control channel blocks that are transmissible using a second modulation scheme, the first modulation scheme having a lower modulation order from among modulation orders of multiple modulation schemes usable for control information within a frame, the second modulation scheme having a modulation order higher than the modulation order of the first modulation scheme within the frame; and
  (2) transmitting first control channel blocks through the first modulation scheme within the frame and transmitting second control channel blocks through the second modulation scheme within the frame, wherein step (2) comprises:
  transmitting control channel blocks having indexes greater than or equal to a parameter value determined based on the second maximum number, by using the first modulation scheme; and
  transmitting control channel blocks having indexes lower than the parameter value by using either the first modulation scheme or both the first modulation scheme and the second modulation scheme.

2. The method of claim 1, wherein the first modulation scheme is a Quadrature Phase Shift Keying (QPSK) scheme and the second modulation scheme is a 16 Quadrature Amplitude Modulation (QAM) scheme.

3. The method of claim 1, wherein the number of first control channel blocks transmitted using the first modulation scheme and the number of second control channel blocks transmitted using the second modulation scheme are determined in consideration of the first maximum number and the second maximum number.

4. The method of claim 1, wherein the control channel blocks transmitted using the second modulation scheme are transmitted through resources for transmitting control channel blocks using the first modulation scheme having a lower index from among the control channel blocks.

5. The method of claim 1, wherein the parameter value corresponds to ½ of the second maximum number (N_HigherMCS_SCCH_Block).

6. The method of claim 1, further comprising negotiating with an Access Terminal (AT) that will receive the control information if the AT can support the second modulation scheme.

7. The method of claim 6, further comprising transmitting a predetermined value (Enable_HigherMCS_SCCH_Decoding) indicating whether the AT can support a demodulation scheme corresponding to the second modulation scheme, based on a result of the negotiation.

8. The method of claim 6, further comprising, as a result of the negotiation, when the AT cannot support the second modulation scheme, transmitting control channel blocks transmissible within the frame by using the first modulation scheme.

9. A method for receiving control information by an Access Terminal (AT) in a mobile communication system using an Orthogonal Frequency Division Multiple Access (OFDMA) scheme, the method comprising the steps of:

(1) receiving information indicating a first maximum number of control channel blocks that are transmissible using a first modulation scheme and information indicating a second maximum number of control channel blocks that are transmissible using a second modulation scheme, the first modulation scheme having a lower modulation order from among modulation orders of multiple modulation schemes usable for control information within a frame, the second modulation scheme having a modulation order higher than the modulation order of the first modulation scheme within the frame; and (2) when the AT supports the second modulation scheme, demodulating as many control channel blocks as a parameter value determined based on the second maximum number by using the second modulation scheme, and demodulating the first maximum number of control channel blocks by using the first modulation scheme, wherein in step (2), control channel blocks having indexes greater than or equal to the parameter value determined based on the second maximum number are demodulated by using a demodulation scheme corresponding to the first modulation scheme, and control channel blocks having indexes lower than the parameter value are demodulated by using demodulation schemes corresponding to the first modulation scheme and the second modulation scheme.

10. The method of claim 9, wherein the parameter value corresponds to ½ of the second maximum number (N_HigherMCS_SCCH_Block).

11. The method of claim 9, wherein the first modulation scheme is a Quadrature Phase Shift Keying (QPSK) scheme and the second modulation scheme is a 16 Quadrature Amplitude Modulation (QAM) scheme.

12. The method of claim 9, further comprising negotiating with an Access Network (AN) transmitting the control channel blocks if the AT can support the second modulation scheme.

13. The method of claim 12, further comprising, as a result of the negotiation, when the AT cannot support the second modulation scheme, demodulating control channel blocks transmitted within the frame by using a demodulation scheme corresponding to the first modulation scheme.

14. The method of claim 12, further comprising receiving a predetermined value (Enable_HigherMCS_SCCH_Decoding) indicating whether the AT can support a demodulation scheme corresponding to the second modulation scheme, based on a result of the negotiation.

15. The method of claim 9, wherein the parameter value corresponds to ½ of the second maximum number (N_HigherMCS_SCCH_Block).

16. An Access Network (AN) apparatus for transmitting control information in a mobile communication system using an Orthogonal Frequency Division Multiple Access (OFDMA) scheme, the AN apparatus comprising:

a controller for determining a first maximum number of control channel blocks that are transmissible using a first modulation scheme and a second maximum number of control channel blocks that are transmissible using a second modulation scheme, negotiating with an Access Terminal (AT) that will receive the control information if the AT can support the second modulation scheme, transmitting control channel blocks having indexes higher than or equal to a parameter value determined based on the second maximum number, by using the first modulation scheme, and transmitting control channel blocks having indexes lower than the parameter value by using either the first modulation scheme or the second modulation scheme, the first modulation scheme having a lower modulation order from among modulation orders of multiple modulation schemes usable for control information within a frame including a plurality of indexed control channel blocks containing the control information, and the second modulation scheme having a modulation order greater than the modulation order of the first modulation scheme within the frame; and a transmission module for transmitting the control channel blocks, information indicating the first maximum number, and information indicating the second maximum number according to determination of the controller.

17. The AN apparatus of claim 16, wherein the first modulation scheme is a Quadrature Phase Shift Keying (QPSK) scheme and the second modulation scheme is a 16 Quadrature Amplitude Modulation (QAM) scheme.

18. The AN apparatus of claim 16, wherein the parameter value corresponds to ½ of the second maximum number (N_HigherMCS_SCCH_Block).

19. The AN apparatus of claim 16, wherein the controller determines to transmit a predetermined value (Enable_HigherMCS_SCCH_Decoding) indicating whether the AT can support a demodulation scheme corresponding to the second modulation scheme, based on a result of the negotiation.

20. An Access Terminal (AT) apparatus for receiving control information in a mobile communication system using an Orthogonal Frequency Division Multiple Access (OFDMA) scheme, the AT apparatus comprising:

a reception module for receiving control information, information indicating a first maximum number of control channel blocks that are transmissible using a first modulation scheme, and a second maximum number of control channel blocks that are transmissible using a first modulation scheme, the first modulation scheme having a lower modulation order from among modulation orders of multiple modulation schemes usable for the control information within a frame including a plurality of indexed control channel blocks including the control information, and the second modulation scheme having a modulation order higher than the modulation order of the first modulation scheme within the frame; and a controller for negotiating with an Access Network (AN) transmitting the control channel blocks, if the AT can support the second modulation scheme, and when a set value after the negotiation indicates that AT supports the second modulation scheme, determining to demodulate control channel blocks having indexes higher than or equal to a parameter value determined based on the second maximum number, by using the first modulation scheme, and determining to demodulate control channel blocks having indexes lower than the parameter value by using both the first modulation scheme and the second modulation scheme.

21. The AT apparatus of claim 20, wherein the first modulation scheme is a Quadrature Phase Shift Keying (QPSK) scheme and the second modulation scheme is a 16 Quadrature Amplitude Modulation (QAM) scheme.

22. The AN apparatus of claim 20, wherein the parameter value corresponds to ½ of the second maximum number (N_HigherMCS_SCCH_Block).

23. The AN apparatus of claim 20, wherein when the AT cannot support the second modulation scheme as a result of the negotiation, the controller determines to demodulate control channel blocks transmissible within the frame by using a demodulation scheme corresponding to the first modulation scheme.

* * * * *